(12) United States Patent
McKervey

(10) Patent No.: US 10,694,158 B2
(45) Date of Patent: Jun. 23, 2020

(54) IMAGE PROJECTOR

(71) Applicant: Canyon Product Development, LLC, Nashville, TN (US)

(72) Inventor: Michael Kevin McKervey, Nashville, TN (US)

(73) Assignee: Canyon Product Development, LLC, Nashville, TN (US)

( * ) Notice: Subject to any disclaimer, the term of this patent is extended or adjusted under 35 U.S.C. 154(b) by 0 days.

(21) Appl. No.: 15/635,791

(22) Filed: Jun. 28, 2017

(65) Prior Publication Data

US 2019/0007661 A1    Jan. 3, 2019

(51) Int. Cl.
*H04N 9/31* (2006.01)
*G02B 26/10* (2006.01)

(52) U.S. Cl.
CPC ........... *H04N 9/3135* (2013.01); *G02B 26/10* (2013.01); *H04N 9/3129* (2013.01); *H04N 9/3161* (2013.01)

(58) Field of Classification Search
None
See application file for complete search history.

(56) References Cited

U.S. PATENT DOCUMENTS

| | | | |
|---|---|---|---|
| 3,448,458 A | 6/1969 | Carlson et al. | |
| 4,241,343 A | 12/1980 | Fan et al. | |
| 6,175,440 B1 | 1/2001 | Conemac | |
| 9,557,630 B1* | 1/2017 | Marason | G03B 21/2013 |
| 2002/0180869 A1* | 12/2002 | Callison | H04N 9/3129 |
| | | | 348/203 |
| 2005/0052720 A1 | 3/2005 | Tetterington | |
| 2008/0247020 A1* | 10/2008 | Malyak | G02B 26/101 |
| | | | 359/201.1 |
| 2010/0020377 A1 | 1/2010 | Borchers et al. | |
| 2010/0142021 A1 | 6/2010 | Malyak et al. | |
| 2010/0296144 A1 | 11/2010 | Borchers et al. | |
| 2011/0221847 A1* | 9/2011 | Takezawa | G03G 15/043 |
| | | | 347/118 |
| 2013/0038736 A1* | 2/2013 | Yamamura | B60Q 1/143 |
| | | | 348/148 |
| 2018/0152697 A1* | 5/2018 | DeVaul | H04N 13/327 |
| 2018/0176473 A1* | 6/2018 | Wippermann | G02B 13/001 |

* cited by examiner

*Primary Examiner* — Samira Monshi
(74) *Attorney, Agent, or Firm* — Gardella Grace P.A.

(57) ABSTRACT

An imaging device and method of projecting an image is provided, the imaging device including a beam source; at least one beam director including at least one encoded image including a horizontal component and a vertical component relative to an orientation of the imaging device; where a beam produced by the beam source is incident upon a surface of the at least one beam director, and the beam is redirected by the at least one beam director onto a projection surface; and an actuator fixed to the at least one beam director such that the at least one beam director is moveable relative to the beam source such that the beam traces out the at least one encoded image on the projection surface; where the actuator is configured to repeatedly move the at least one beam director such that the at least one encoded image appears visible.

26 Claims, 15 Drawing Sheets

IMAGE PROJECTOR

TECHNICAL FIELD

The present disclosure relates generally to image projection systems, and more specifically to an image projection system including a beam director having an encoded image.

BACKGROUND

During certain hazards, or in certain locations, it can be beneficial to project information about exits, emergency stations, or any other similar information onto the ground or other visible surfaces where it would not be desirable to present such information in a permanent fashion, such as via paint or permanently erected signs. One solution to this is to utilize a projection system to project the pertinent information or iconography on the desired surface only at the appropriate times.

Complex laser imaging systems, such as those utilized in projectors, include multiple complex mirrors, each of which is required to move in synchronization with each of the others mirrors in order to generate a desired image. Laser imaging systems typically include complex and delicate electronic and mechanical controls that control the synchronization of the mirrors. As a result of the significant number of colors and lasers utilized, as well as the delicate electronics within a projector, continued, uninterrupted, operation of the projector under hazard conditions, such as those that would be present in the case of a fire, flood, exposure to the elements, forces from transportation, or any similar hazard, is unreliable or impossible.

SUMMARY

An exemplary method of projecting an image includes emitting a beam onto a beam director, redirecting the beam onto a projection surface using the beam director, and moving the beam director relative to a beam source such that the beam traces out the at least one image on the projection surface. The beam director includes at least one image encoded onto the beam director.

In another example of the above described exemplary method of projecting an image, the at least one image is encoded on the beam director via a shape and dimensions of at least one surface of the beam director.

In another example of any of the above described exemplary methods of projecting an image further includes reflecting the beam off of the beam director.

In another example of any of the above described exemplary methods of projecting an image, moving the beam director relative to the beam source includes rotating the beam director about an axis.

In another example of any of the above described exemplary methods of projecting an image, a redirection angle of the beam is dependent on a specific angle in three dimensional space of an incident surface of the beam director, a location of the beam source relative to the beam director, and a point of incidence of the beam on the beam director.

In another example of any of the above described exemplary methods of projecting an image, the beam is refracted by the beam director.

In another example of any of the above described exemplary methods of projecting an image, moving the beam director relative to the beam source includes moving the beam director linearly.

In another example of any of the above described exemplary methods of projecting an image, the beam director includes an array of angled faces and a location where the beam is incident upon the beam director passes through the array of angled faces as the beam director moves.

In another example of any of the above described exemplary methods of projecting an image, a location of the beam on the projection surface is at least partially controlled by an angle of a face of the beam director that the beam is incident upon relative to the beam.

In another example of any of the above described exemplary methods of projecting an image, the beam source is continuously on as the at least one image is traced.

In another example of any of the above described exemplary methods of projecting an image, the beam source is cycled between an on state and an off state as the at least one image is traced.

In another example of any of the above described exemplary methods of projecting an image, movement of the beam director is cyclical.

In another example of any of the above described exemplary methods of projecting an image, movement of the beam director undergoes at least 24 cycles per second.

In another example of any of the above described exemplary methods of projecting an image, moving the beam director includes at least one of rotating the beam director about an axis and moving the beam director linearly.

In one exemplary embodiment an imaging device includes a beam source configured to produce a beam, at least one beam director including at least one encoded image, wherein the beam is incident upon a surface of the at least one beam director, and the beam is redirected by the at least one beam director onto a projection surface, and an actuator configured to move the at least one beam director relative to the beam source such that the beam traces out the at least one encoded image on a projection surface.

In another example of the above described imaging device, the at least one encoded image is encoded on the at least one beam director via a shape and dimension of the surface of the at least one beam director.

In another example of any of the above described imaging devices, the at least one surface of the at least one beam director includes a plurality of faces.

In another example of any of the above described imaging devices, the actuator is a rotary actuator and a radius of the at least one beam director is non-uniform relative to an axis of rotation.

In another example of any of the above described imaging devices, the actuator is a linear actuator, and the at least one beam director includes a clear structure having an incident surface and a refraction surface, each of the refraction surface and the incident surface are at varied angles relative to the beam.

In another example of any of the above described imaging devices, the surface of the at least one beam director includes at least one of a non-reflective surface and a diffusive surface.

Another example of any of the above described imaging devices further includes at least one component disposed in a path of the beam after the beam is redirected by the at least one beam director and configured to alter the path of the beam, wherein the component includes at least one of a mirror and a lens, and wherein the component is configured to be articulated relative to the beam director.

In another example of any of the above described imaging devices, the beam source is configured to be articulated relative to the beam director.

These and other features of the present invention can be best understood from the following specification and drawings, the following of which is a brief description.

DETAILED DESCRIPTION

Figure 1A:
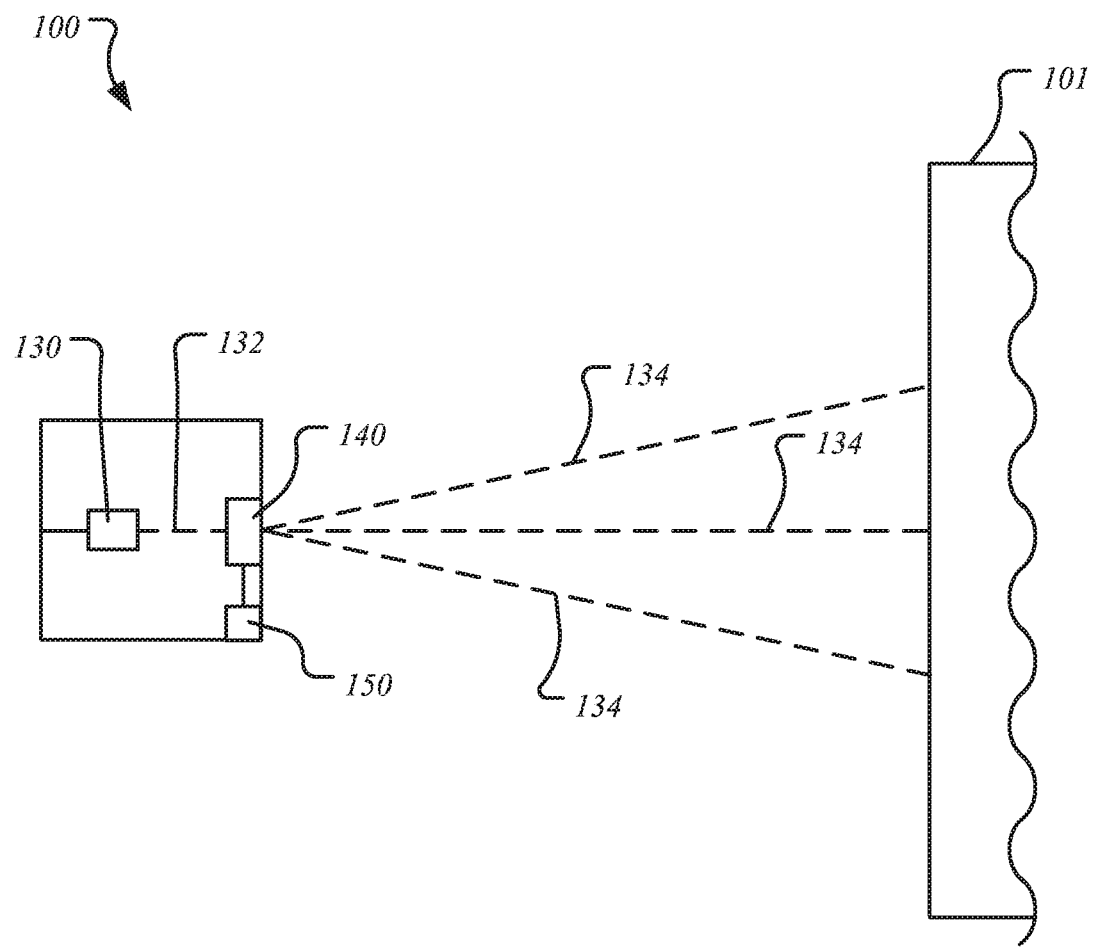
FIG. 1A schematically illustrates an exemplary imaging system.
Figure 1B:
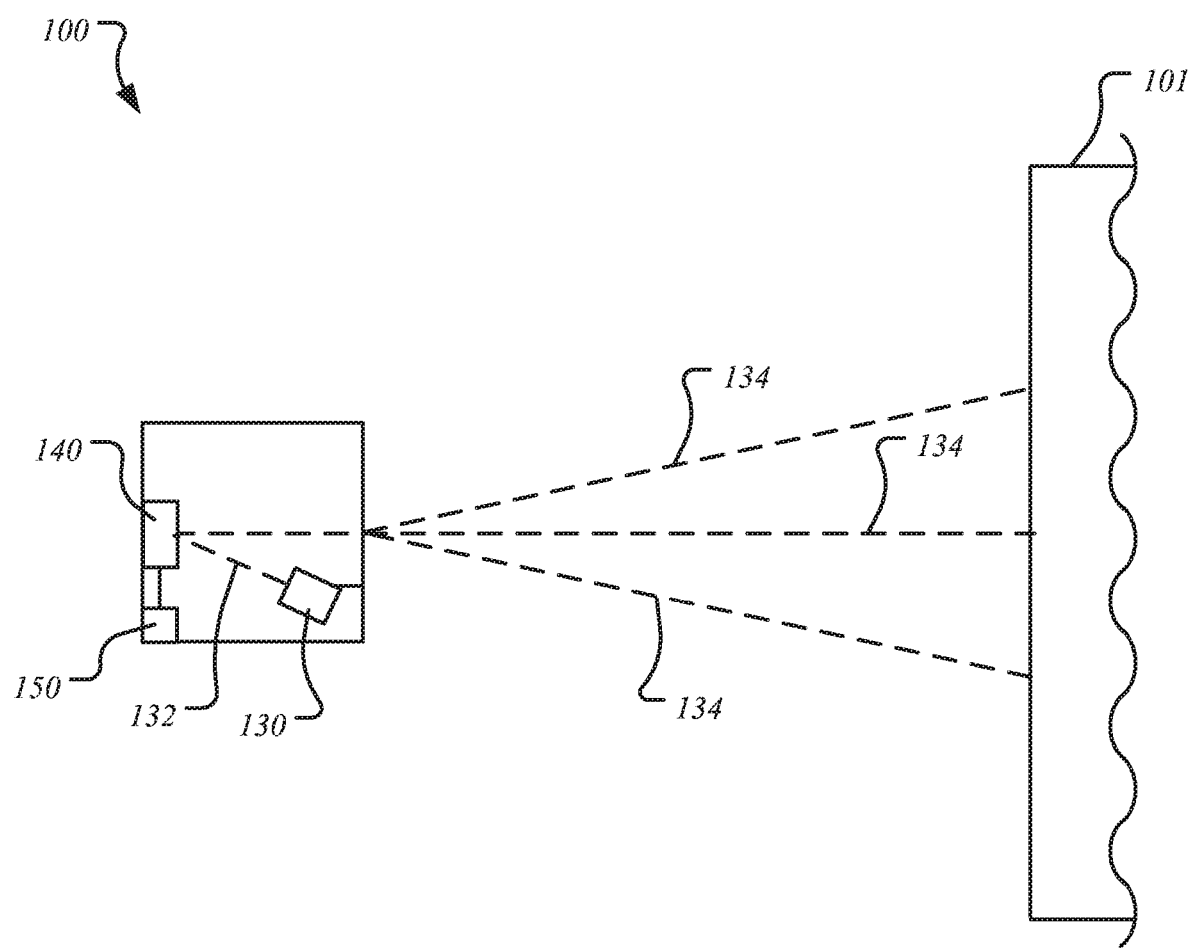
FIG. 1B schematically illustrates an alternate exemplary imaging system.

FIG. 1A schematically illustrates an imaging system 100 designed and configured to display an image on a projection surface 101, such as a wall, floor, billboard, hillside, forest floor, or the like utilizing a refractive beam director 140. Similarly, FIG. 1B schematically illustrates the imaging system 100 configured to utilize a reflective beam director 140. The imaging system 100 includes a beam source 130 that generates a beam 132, such as a laser beam. To create a stationary image the beam source 130 is maintained in a stationary position, and the beam 132 is emitted along a constant beam path.

The beam 132 is incident on a beam director 140. The beam director 140 alters the path of the beam 132 through reflection, refraction, or a combination of reflection and refraction, depending on the type of beam director 140 utilized. An actuation device (referred to as an actuator 150), such as a linear or rotary actuator, actuates the beam director 140, causing the beam director 140 to move relative to the beam 132. By way of non-exclusive example, the relative movement can be a rotation of the beam director 140 about an axis, a linear movement of the beam director 140, or a combination of the two. The movement of the beam director 140 determines the angle that the beam 132 is altered by controlling the position or positions that the beam 132 is incident on the beam director 140, as illustrated via multiple altered beam paths 134.

As the altered beam path 134 moves, the point at which the beam contacts the projection surface 101, and thus the point at which the beam is visible, moves along the projection surface 101. By actuating the beam director 140 in cycles, a cohesive image, or multiple distinct images, can be drawn (via tracing) on the projection surface 101. While described herein in singular form, it should be understood that the projection surface 101 can be a single surface, multiple adjacent surfaces, multiple discontinuous surfaces, or any other surface configuration. Further, by cycling the beam director 140 faster than the visual recognition rate of a human being, a single shape, or image, is projected onto the projection surface 101. In such an example, the image is traced by the incident light of the altered beam path 134 on the projection surface 101 and the beam director 140 is cycled at least 24 cycles per second. In alternative examples, such as those where it is desirable for a person to see the image being traced on a surface, the beam director 140 is cycled with less cycles per second.

In order to control the redirection angle of the altered beam path 134, the beam director 140 includes angled reflection or refraction surfaces (see FIGS. 1A-4B), with the angle of the surface at the point of incidence between the beam 132 and the reflection or refraction surface of the beam director 140 at least partially determining the angle that the altered beam path 134 is redirected. By way of example, the angle at the point of incidence is determinative of the redirection of the altered beam path 134 in a reflective beam director 140, whereas the angle at the point of incidence in combination with the material selection, as well as a spacing between surfaces is determinative of the redirection of the altered beam path 134 with a refractive beam director 140.

The position and/or orientation of the beam director 140 is altered by the actuator 150, such as a linear actuator or rotary actuator. Alternatively, any similar means of achieving the position and/or orientation change can be utilized to the same effect. Correspondingly, the angle of the reflecting surface or refracting surfaces of the beam director 140, at the position where the beam 132 is incident on the beam director 140, changes along the reflection surface or refraction surfaces, resulting in the position of the altered beam path 134 incident upon the projection surface 101 tracing out an image encoded on the beam director 140 as the beam director 140 is actuated.

By utilizing one or more surfaces having multiple set angles at the point of incidence, the resultant image traced out on the projection surface 101 is hard encoded into the beam director 140. In other words, the physical dimensions of the beam director 140 encode the image that is projected. In some examples, the imaging system 100 can be designed with the ability to switch out the beam director 140 for an alternate beam director 140, thereby allowing a user to change the projected image. In yet further examples, multiple beam directors 140 can be included, and a secondary actuation system can be utilized to switch which beam director 140 the beam 132 is incident upon during any given operation. In yet further examples, multiple lasers, or other beam sources, and/or a redirection component can be utilized to alter an incident position on the beam director 140, thereby altering the encoded image that is displayed.

Further, by hard encoding the image on the beam director 140, relatively simple rotary or linear actuation, or any similar mechanical movement, can be utilized to generate the image, allowing the imaging system 100 to operate without requiring complex controls. By way of example, if the imaging system 100 is designed to project an arrow, or other directional icon, leading individuals to an exit during a fire or similar emergency, a simple rotary or linear actuation system can continue to function while a more complex electronic system requiring timed beam sources, multiple synchronized actuated mirrors, or switching between multiple beams and beam directors, would degrade, require maintenance, or otherwise cease to operate due to the harsh environment.

With continued reference to FIGS. 1A-1B, and the imaging system 100 described above, FIGS. 2A and 2B illustrate an exemplary reflective beam director 200 from an isometric view (FIG. 2A) and a cross sectional view (FIG. 2B). The reflective beam director 200 is generally disc or cylinder shaped, defining an axis 210 of rotation through a generally midpoint of the beam director 200 body. While illustrated in the example figures having flat top and bottom surfaces 212, 214 generally normal to the axis 210, the top and bottom surfaces 212, 214, can be angled, rounded, or any other similar shape.

The beam director 200 includes a reflective incident surface 220 on which the beam 132 is incident. The specific angle in three dimensional space of the incident surface 220, location of the beam source relative to the beam director 200, and point of incidence of the beam 132 on the beam director 200, determines the redirection angle of the altered beam path 134 (illustrated in FIGS. 1A and 1B). Also included in the example is a second, non-continuous incident surface 250. The non-continuous incident surface 250 is non-continuous with the incident surface 220, and can be, in some examples, the beginning and end of the image encoding. In some examples, the non-continuous incident surface 250 can be non-reflecting, reflect a diffused beam, or reflect the beam away from the projection surface 101 of FIGS. 1A and 1B. In alternative examples, multiple images can be encoded on a single beam director 200. In some examples, multiple non-continuous incident surfaces 250 may be included.

Further, one of skill in the art having the benefit of this disclosure will understand that the beam director 200 need not be a solid component in some examples. In such examples, the reflective incident surface 220, or surfaces 220, 250 can be connected to an attachment feature via ribs, webbing, or any similar type of structural support.

Also included in the beam director 200 is a mounting feature 230, illustrated in the example embodiment as a hole. In alternate examples, any other mechanical feature for linking the beam director 200 to a rotary actuator can be utilized to the same effect. In some examples, a radius 240 from the axis 210 to the continuous incident surface 220 varies along the circumference of the beam director 240. In such an example, the angle by which the altered beam path 134 is redirected is additionally determined in part by the radius 240.

The angle of the incident surface 220 at the point struck by the beam 132 changes as the beam director 200 rotates about the axis 210. This change causes the altered beam path to change its path in three dimensional space.

Figure 2A:
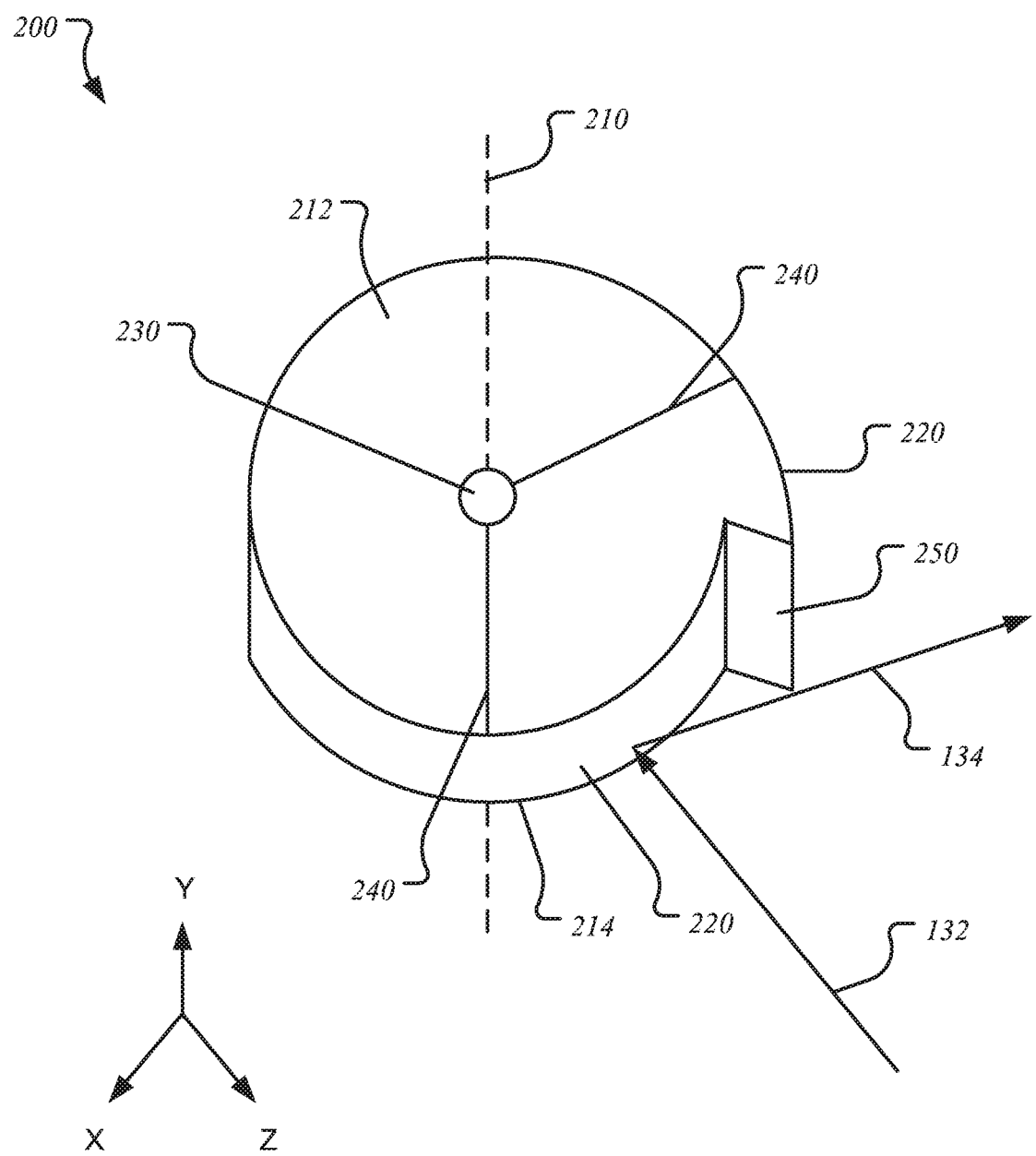
FIG. 2A schematically illustrates an exemplary reflective beam director according to a first embodiment.
Figure 2B:
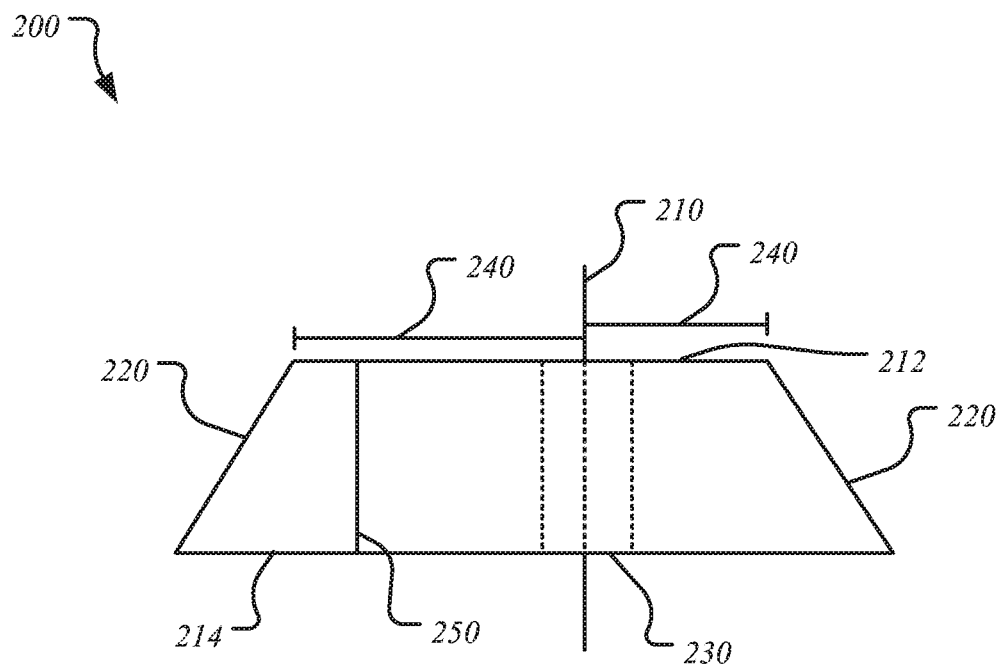
FIG. 2B schematically illustrates a cross sectional view of the exemplary reflective beam director of FIG. 2A.
Figure 3:
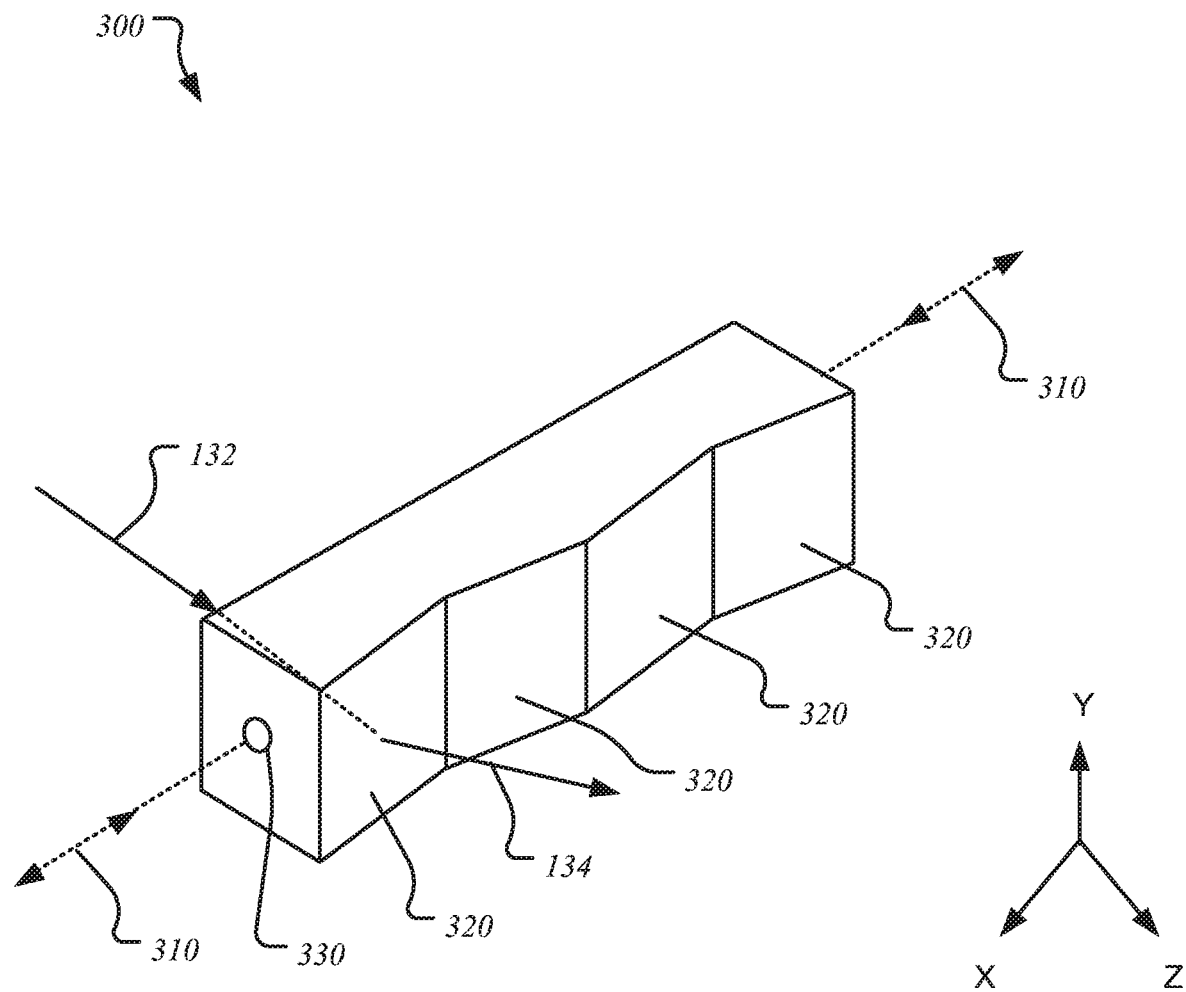
FIG. 3 schematically illustrates an exemplary refractive beam director according to a first embodiment.

With continued reference to FIGS. 1A-2B, an alternate example beam director 300 is illustrated in FIG. 3. The beam director 300 of FIG. 3 is a clear structure, such as a prism, including one or more refractive surfaces 320. While illustrated as discrete refractive surfaces 320 arranged in a linear fashion, one of skill in the art having the benefit of this disclosure will understand that the refractive surfaces 320 can gradually shift from one angle to another angle, without being discrete surfaces via the utilization of a curved surface, or any similar feature. As with the reflective incident surface 220, of FIGS. 2A and 2B, the angle of the refractive surface 320, relative to the beam 132, alters the beam path, creating an altered beam path 134 in the X-Y-Z coordinates, referred to moving forward as "three dimensional space", causing the point of incidence of the altered beam path 134 on the projection surface 101 to shift. Further, while illustrated in the example beam director 300 as only including refractive surfaces 320 on one side of the beam director 300, it should be appreciated that the opposite side of the beam director 300 can also include refractive surfaces. In such an example it is the relative angle between the refractive surfaces that is determinative of the angle by which the altered beam path 134 is redirected.

The beam director 300 includes an attachment feature 330 configured to provide a mechanical interconnect between the beam director 300 and a corresponding linear actuator. The linear actuator displaces (moves) the beam director 300 along a line of actuation 310. As the beam director 300 is shifted along the line of actuation 310, the altered beam path 134 shifts in the three dimensional space corresponding to the angle of the refractive surface 320, or the relative angles of the refractive surfaces 320. The utilization of multiple angled refractive surfaces 320, or a single refractive surface 320 where the instantaneous angle of the surface at the point of incidence of the beam 132 changes along the length, causes a shape to be traced out on the projection surface 101.

In such an example, the actuator 150 is a linear actuator that causes the beam director 300 to move back and forth along the line of actuation. By cycling the beam director 300 in full cycles at greater than 24 cycles per second, the shape is traced on the projection surface faster than the refresh rate of the human eye, causing a viewer to see a single drawn shape.

Further, as with the reflective example of FIGS. 2A and 2B, the linear actuation allows the imaging system 100 to be functional in harsh environments, or with minimal controls, thereby facilitating its use in emergency warning/notification systems, low maintenance systems, and the like.

Figure 4A:
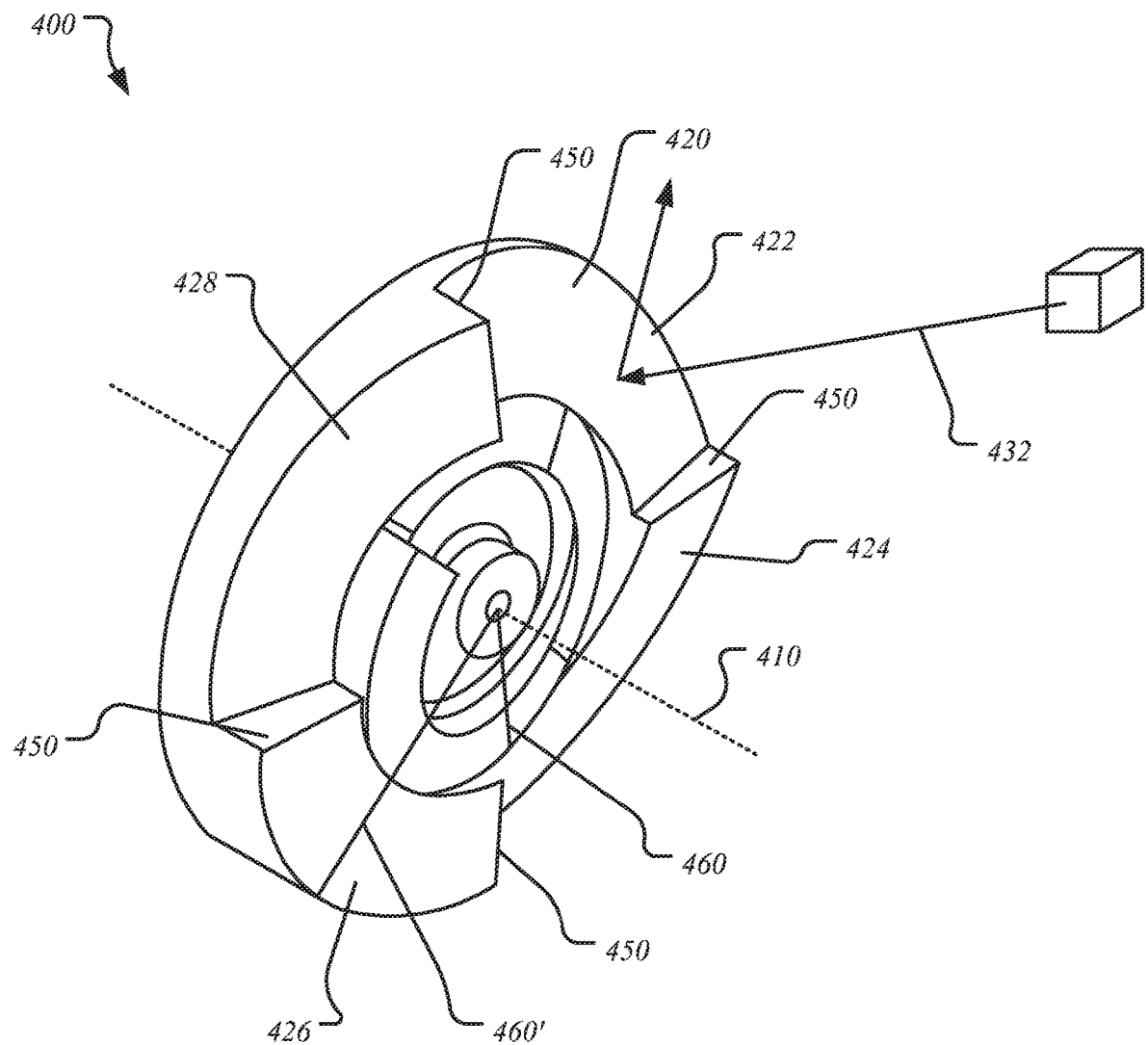
FIG. 4A schematically illustrates an exemplary reflective beam director according to a second embodiment.
Figure 4B:
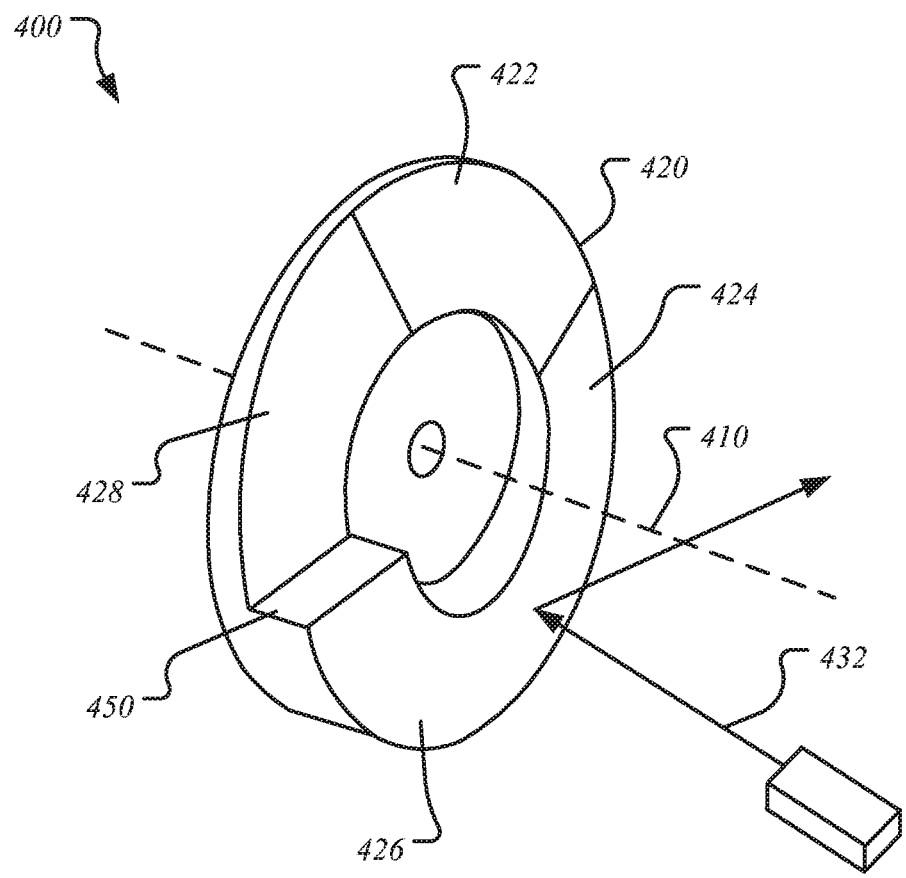
FIG. 4B schematically illustrates an exemplary reflective beam director according to a third embodiment.
Figure 5:
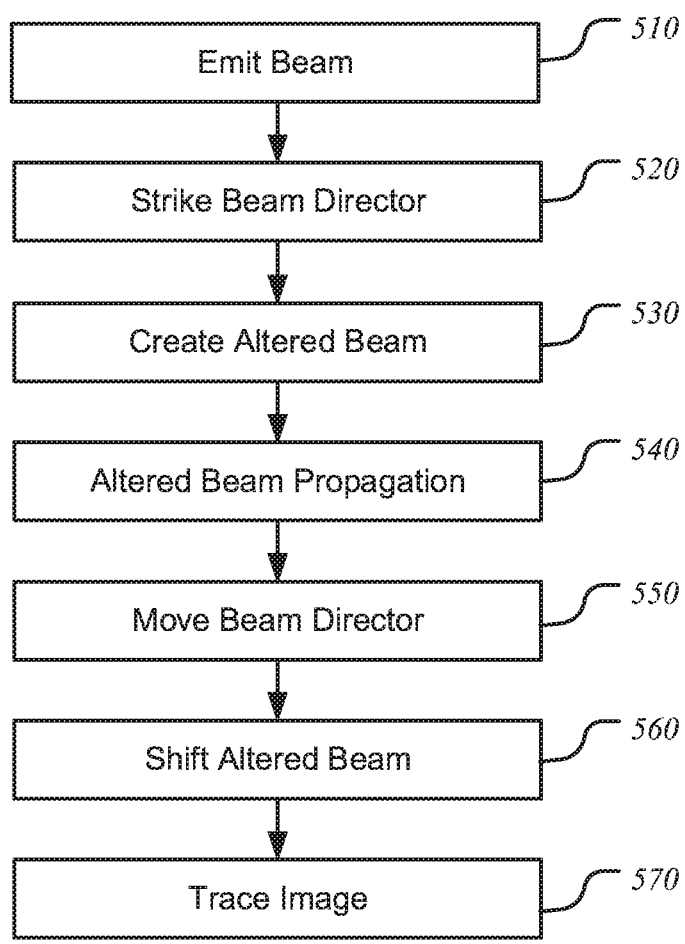
FIG. 5 is a flowchart illustrating a method for projecting an image using the imaging systems described herein.
Figure 6A:
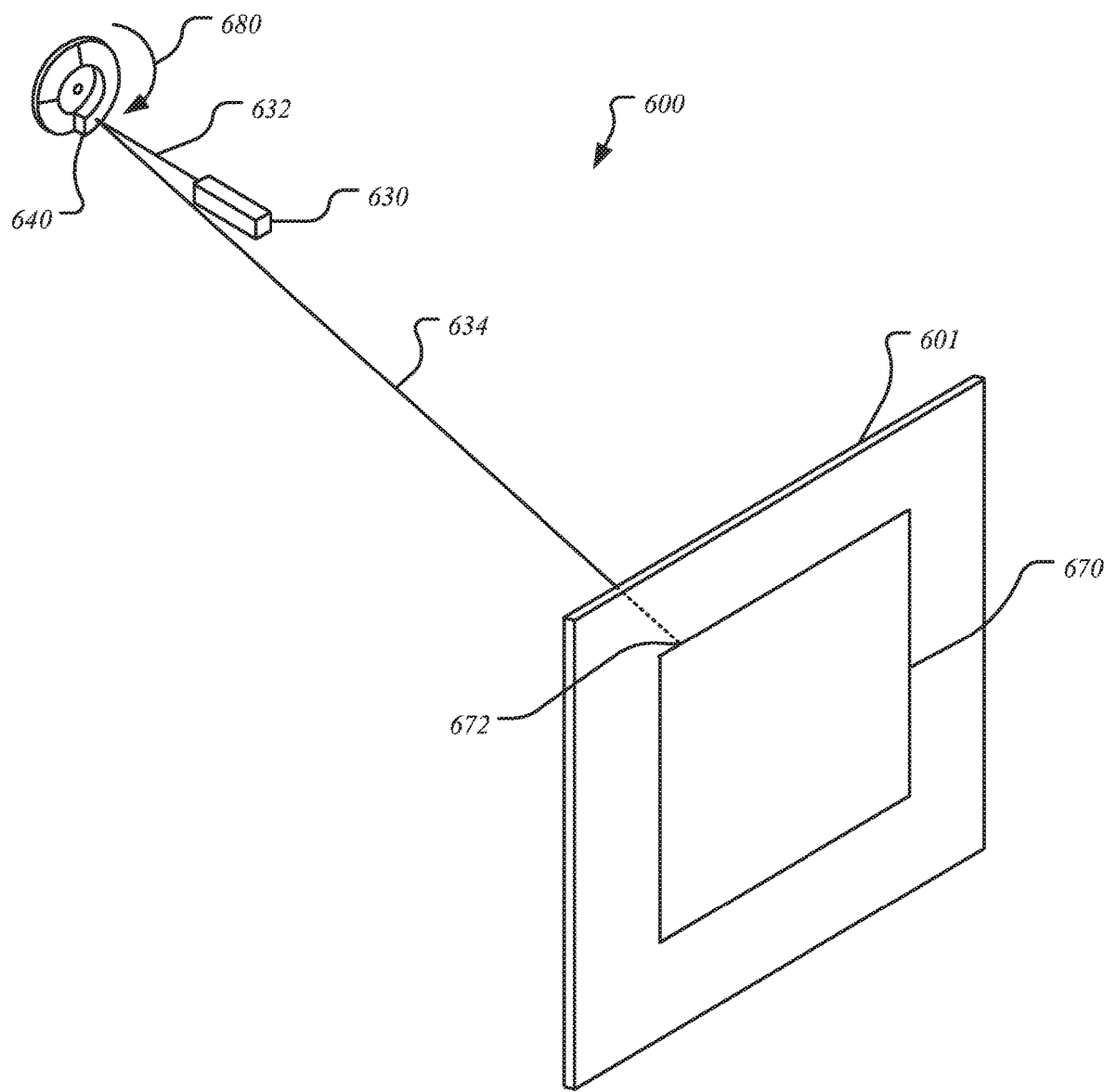
FIGS. 6A-6D schematically illustrate an exemplary imaging system projecting an imaging according to the process of FIG. 5.
Figure 6B:
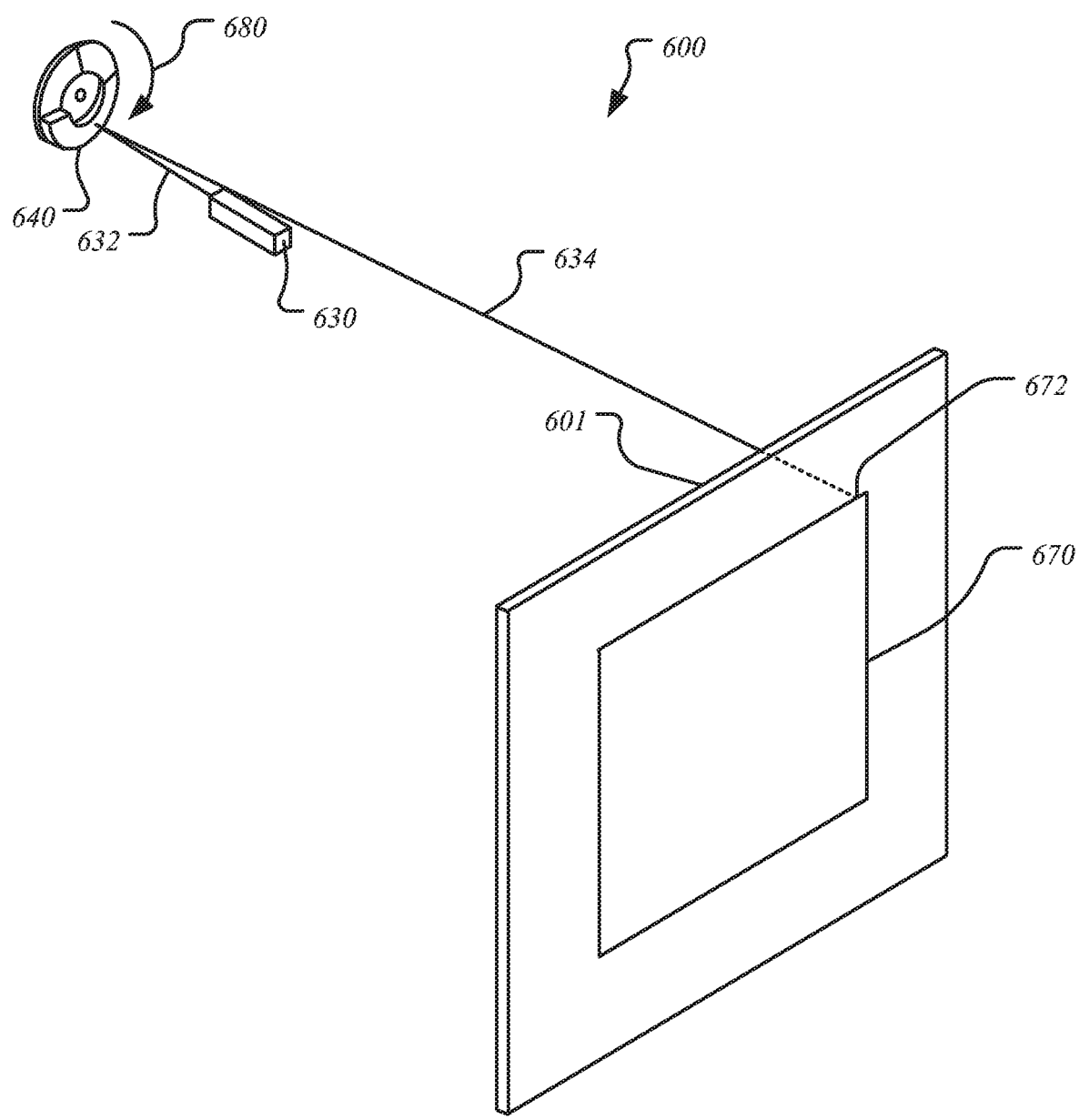
Figure 6C:
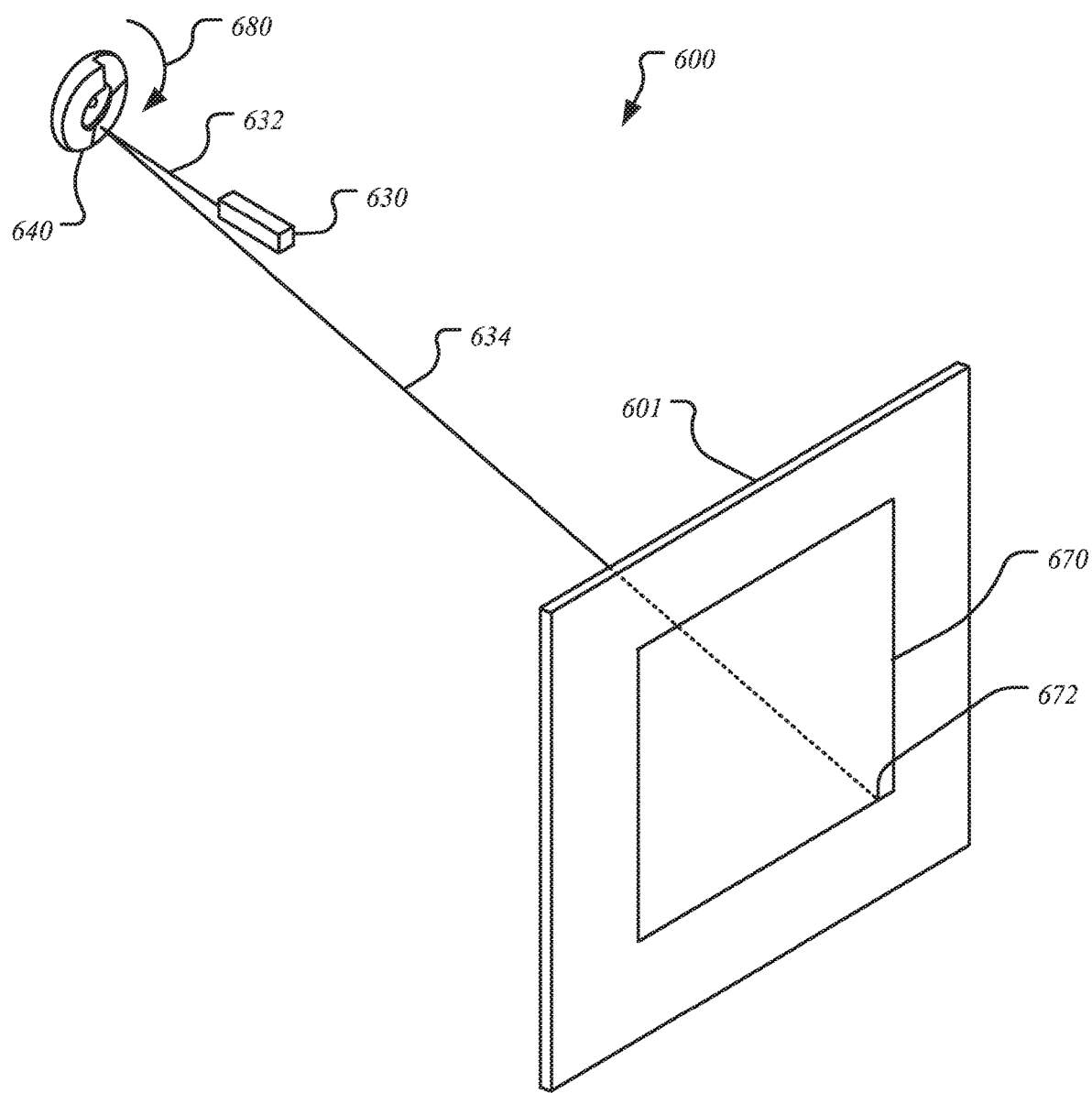
Figure 6D:
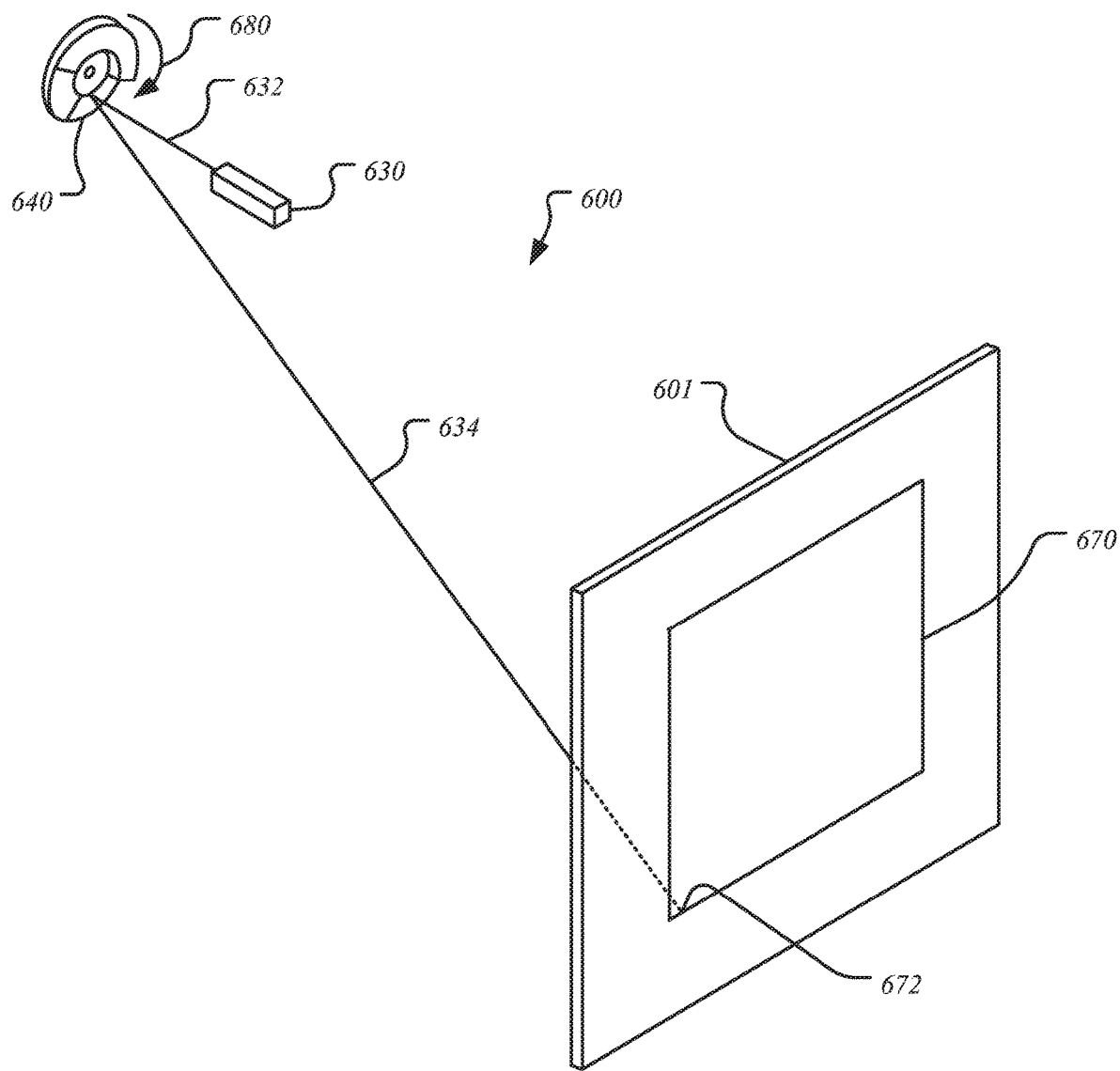

FIGS. 4A and 4B schematically illustrates alternative example beam directors 400. In each example, the beam director 400 includes a reflecting composite surface 420 having multiple angled facing surface 422, 424, 426, 428. Each of the angled facing surfaces 422, 424, 426, 428 in the example of FIG. 4A is connected to an adjacent angled facing surface 422, 424, 426, 428 by a discontinuous surface 450. In contrast, each of the angled facing surfaces 422, 424, 426, 428 in the example of FIG. 4B is connected to at least one adjacent angled surface 422, 424, 426, 428, and only a single discontinuous surface 450 is utilized. The angle of the reflecting composite surface 420 at the point struck by the beam 432 changes as the beam director 400 rotates about an axis 410. This change causes the altered beam path to change its path in three dimensional space. Each of the angled facing surfaces 422, 424, 426, 428 includes one or more angles, relative to the beam 432, with the angle of the reflecting composite surface 420 at any given radial position determining the angle in three dimensional space by which the beam 432 is altered.

As the angle of the facing surfaces 422, 424, 426, 428 along the incident arc are not constant across the arc length of the facing surface 422, 424, 426, 428 the angle that the beam 432 is reflected is changed as the beam director 400 is rotated. This altered reflection angle in turn allows an image to be traced out as described above.

Each of the discontinuous surfaces 450, can be non-reflective, diffusive, or can reflect away from the projection surface. In this manner multiple distinct images, or breaks within a single image, can be encoded on a single beam director and rotation of the beam director 400 will cycle through the distinct images. Alternatively, the facing surfaces 422, 424, 426, 428 can form a more complex single image including two or more disjointed image elements. In yet further alternatives, the facing surfaces 422, 424, 426, 428 can be utilized to create a single continuous image and to provide a more balanced beam director 400.

In some example embodiments, such as the example of FIG. 4A, the specific images are encoded at a given radius 460 on the beam director. In such an example, additional images can be encoded at different radii 460'. During operation a linear actuator can shift the beam director 400 in a direction normal to the axis 410. This radial shift alters the arc along which the beam 432 is incident on the beam director 400, allowing the beam director 400 to shift between the encoded images as necessary. In alternative examples, mirrors or similar reflective surfaces could be utilized to achieve the shifting between encoded images by altering the incident position of the beam 432.

In yet further examples, multiple beam directors can be included within the imaging device. In such examples, a controller can transition the imaging device between the beam directors, and multiple images can be stored in the imaging device.

With continued reference to FIGS. 1A-4B, FIG. 5 illustrates a flowchart describing a method 500 of projecting an image using any of the above described imaging devices. Initially, an incident beam is emitted from source, such as a laser, in an "Emit Beam" step 510. The incident beam is directed toward a beam director, and strikes the beam director in a "Strike Beam Director" step 520. The beam director then redirects the beam using reflection, refraction, or a combination of reflection and refraction, thereby creating an altered beam in a "Create Altered Beam" step 530. The altered beam then continues on a line away from the beam director onto a projection surface in an "Altered Beam Propagation" step 540.

The beam director then moves in a predetermined pattern, causing the point of incidence between the beam director and the beam to shift along a surface of the beam director in a "Move Beam Director" step 550. The shifting point of incidence causes the altered beam to shift in a "Shift Altered Beam" step 560, and ultimately causes the point where the altered beam strikes the projection surface to move in a "Trace Image" step 570. The movement of the altered beam on the projection surface traces out a visible image.

With continued reference to the method of FIG. 5, and with reference again to the imaging system illustrated at FIG. 1B, FIGS. 6A-D illustrate a progression of an imaging system 600, such as could be used in the configuration shown in FIG. 1B, as the imaging system 600 progresses through the method 500. As described in the method 500, a beam source 630 emits a beam 632 toward a beam director 640. The beam 632 is reflected off of the beam director 640 creating an altered beam 634. The altered beam 634 strikes a projection surface 601, and the point of incidence 672 on the projection surface 601 is illuminated.

As the beam director 640 is rotated, about a rotation 680, the position of the altered beam 634 shifts. The resultant shifts, trace out an image 670 on the projection surface 601. In the illustrated example, the image 670 is a rectangle. In alternative examples, the angles and structure of the beam director 640 could result in distinct images, including, but not limited to, arrows, X's, or any other desired symbol.

Figure 7:
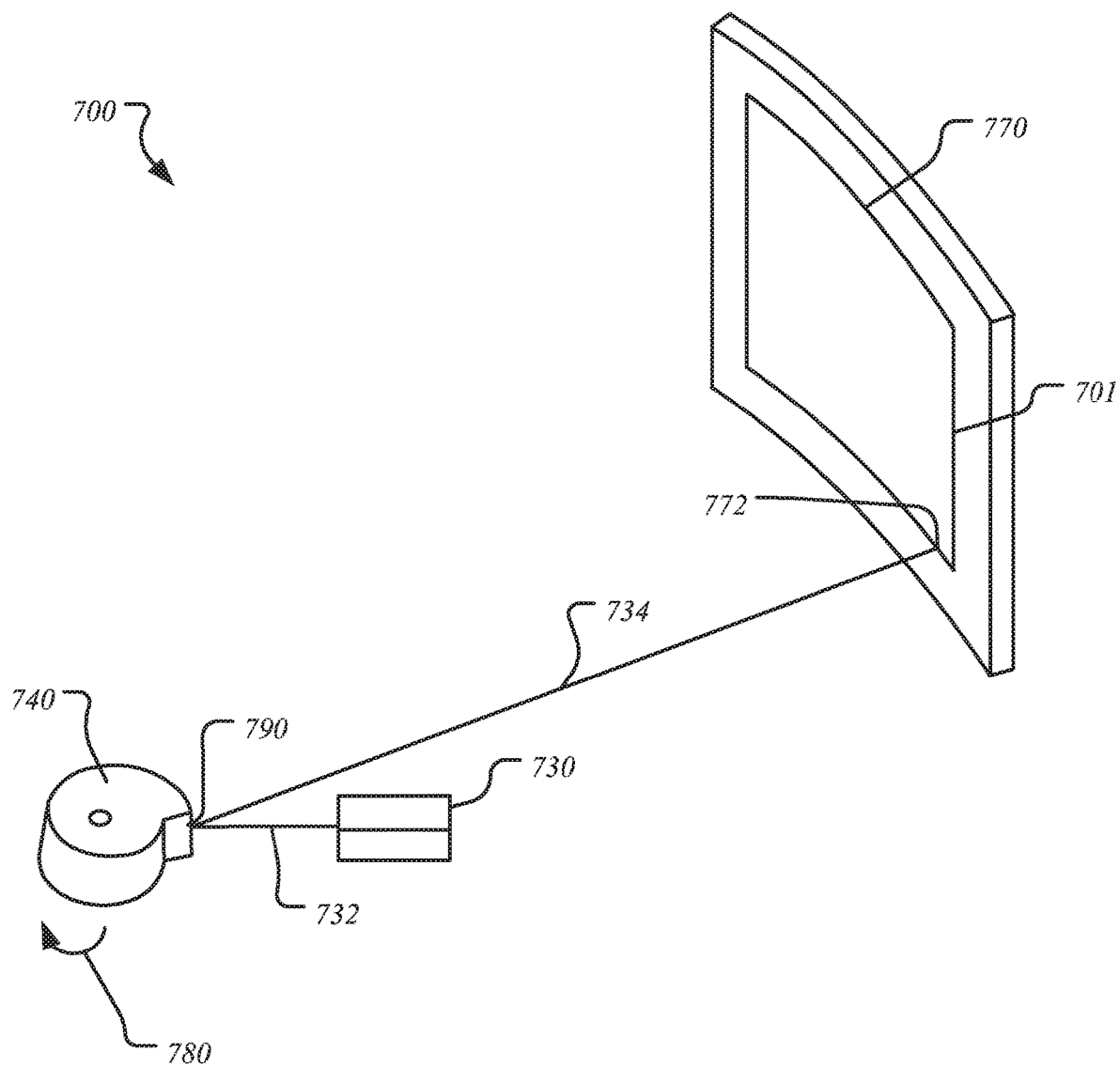
FIG. 7 schematically illustrates an imaging system including a beam director according to the beam director design of FIGS. 2A and 2B.

With continued reference to FIGS. 6A-6D, and referring again to FIGS. 2A and 2B, FIG. 7 illustrates an imaging system 700 including a beam director 740 according to the beam director design of FIGS. 2A and 2B. As with the example of FIG. 6, the imaging system 700 includes a beam source 730 that emits a beam 732 onto the beam director 740. The beam director 740 rotates along a rotation 780, causing the beam 732 to be reflected off of the beam director 740 at an incident point 790 on the beam director 740, creating an altered beam 734. The altered beam 734 strikes a projection surface 701 at an incident point 772 on the projection surface 701 and traces out an image 770.

As the beam director 740 is rotated, the incident point 772 on the projection surface 701 traces out the image 770 in the manner described above.

Figure 8A:
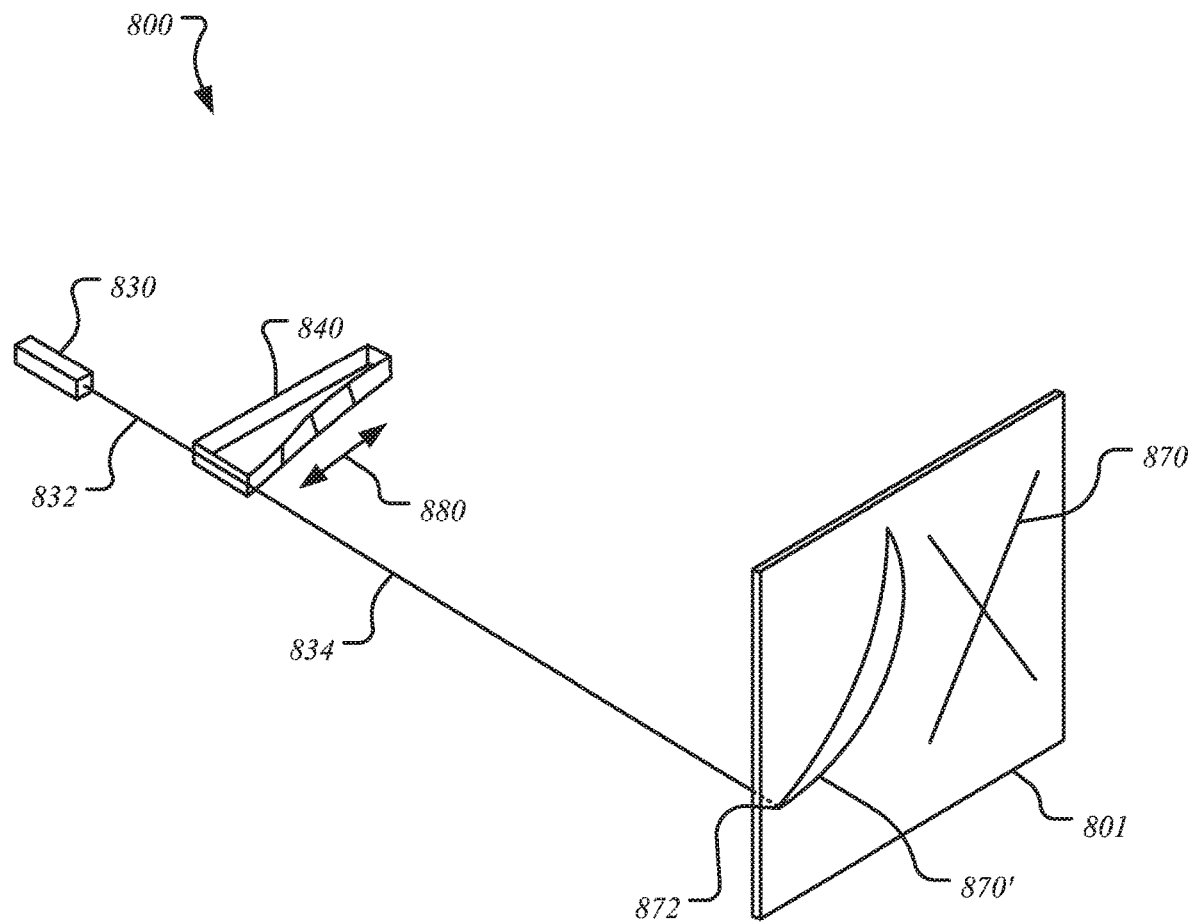
FIGS. 8A and 8B schematically illustrate an imaging system including a beam director according to the beam director design of FIG. 3.
Figure 8B:
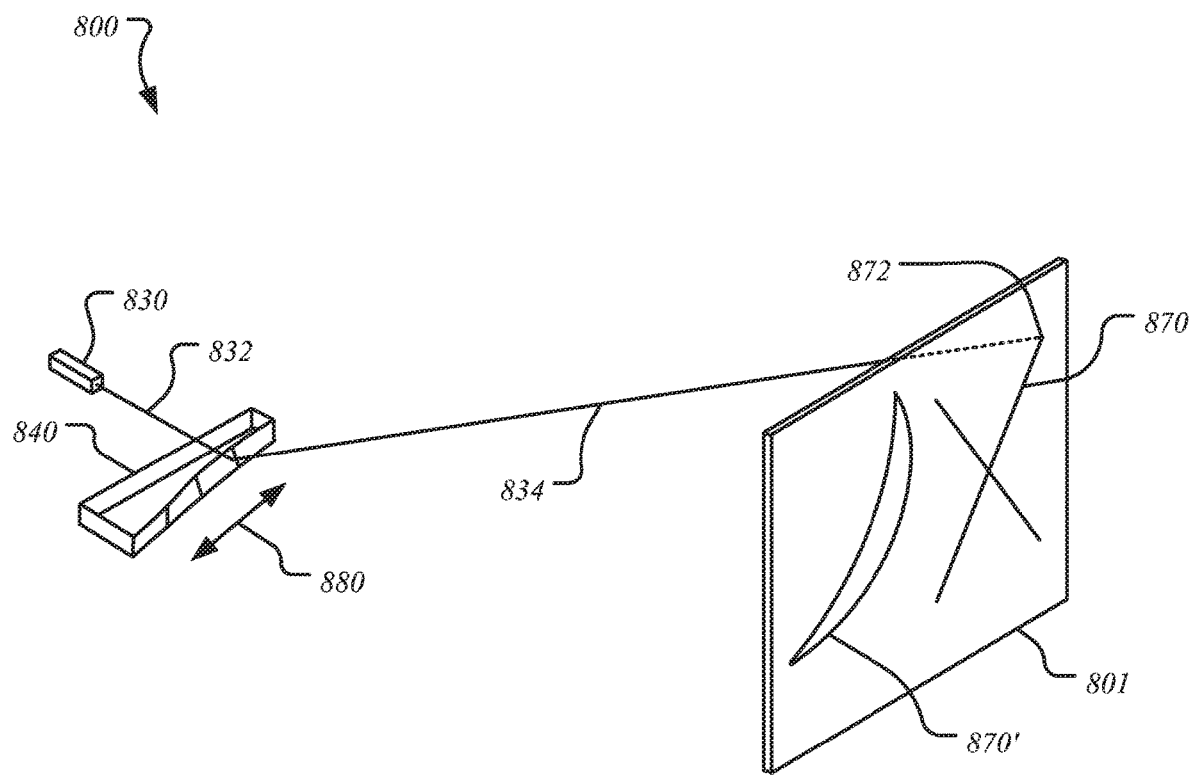

With continued reference to FIGS. 6A-6D, and referring again to FIG. 3, FIGS. 8A and 8B illustrate an imaging system 800 including a beam director 840 according to the beam director design of FIG. 3. As with the example of FIG. 6, the imaging system 800 includes a beam source 830 that emits a beam 832 onto the beam director 840. The beam director 840 shifts linearly along an axis 880, causing the beam 832 to be refracted by the beam director 840, creating an altered beam 834. The altered beam 834 strikes a projection surface 801 at an incident point 872 on the projection surface 801.

As the beam director 840 is shifted, the incident point 872 on the projection surface 801 traces out an image 870, 870' in the manner described above in FIG. 5.

Further exemplified in FIGS. 8A and 8B is the inclusion of multiple distinct images 870, 870' encoded onto the single beam director 840. The distinct images 870, 870' can be closed images, such as the example of image 870', or open images, such as the example of image 870.

In one alternative example, lenses and/or mirrors can be utilized to further alter the path of the beam or altered beam. This can be used, according to known principles, to control the size, location, focus, or keystone of the image on the screen. The mirrors and/or lenses can be mechanically actuated in some examples. In such an example, the resultant image projected onto the projection surface will appear to be changing size, location, focus and/or keystone on the surface.

In one alternative example, adjustments to the location of the beam source can be utilized to further alter the path of the beam. This can be used, according to known principles, to control the size, location, or keystone of the image on the screen. The beam source can be mechanically actuated in some examples. In such an example, the resultant image projected onto the projection surface will appear to be changing size, location or keystone on the surface.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of projecting an image comprising of:
   emitting a beam onto a beam director, the beam director including at least one image encoded in a geometry of the beam director, wherein the image encoded onto the beam director includes a horizontal component and a vertical component, relative to an orientation of an imaging system including the beam director;
   redirecting the beam onto a projection surface using the beam director; and
   moving the beam director relative to a beam source such that the beam, as redirected by the beam director, repeatedly traces out the at least one image on the projection surface at a rate greater than a refresh rate of the human eye;

wherein the moving causes the at least one image to appear as visible information comprising at least a portion of one or more of a shape and a message on the projection surface.

2. The method as set forth in claim 1, wherein the at least one image is encoded on the beam director via a shape and dimensions of at least one surface of the beam director.

3. The method as set forth in claim 1, further comprising reflecting the beam off of the beam director.

4. The method as set forth in claim 1, wherein moving the beam director relative to the beam source comprises rotating the beam director about an axis.

5. The method as set forth in claim 4, wherein a redirection angle of the beam is dependent on a specific angle in three dimensional space of an incident surface of the beam director, a location of the beam source relative to the beam director, and a point of incidence of the beam on the beam director.

6. The method as set forth in claim 1, wherein the beam is refracted by the beam director.

7. The method as set forth in claim 1, wherein moving the beam director, relative to the beam source comprises moving the beam director linearly.

8. The method as set forth in claim 7, wherein the beam director comprises an array of angled faces and a location where the beam is incident upon the beam director passes through the array of angled faces as the beam director moves.

9. The method as set forth in claim 8, wherein a location of the beam on the projection surface is at least partially controlled by an angle of a face of the beam director that the beam is incident upon relative to the beam.

10. The method as set forth in claim 1, wherein the beam source is continuously on as the at least one image is traced.

11. The method as set forth in claim 1, wherein the beam source is cycled between an on state and an off state as the at least one image is traced.

12. The method as set forth in claim 1, wherein movement of the beam director is cyclical.

13. The method as set forth in claim 12, wherein movement of the beam director undergoes at least 24 cycles per second.

14. The method as set forth in claim 1, wherein moving the beam director comprises at least one of rotating the beam director about an axis and moving the beam director linearly.

15. An imaging device comprising:
a beam source;
at least one beam director including at least one encoded image, the at least one encoded image including a horizontal component and a vertical component, relative to an orientation of the imaging device, wherein the at least one encoded image of each beam director of the at least one beam director is encoded in a geometry of the respective beam director, and
a beam produced by the beam source is incident upon a surface of the at least one beam director, and the beam is redirected by the at least one beam director onto a projection surface; and
an actuator fixed to the at least one beam director such that the at least one beam director is moveable relative to the beam source, wherein
the beam, while the at least one beam director is being moved by mechanically cycling the actuator, repeatedly traces out the horizontal component and the vertical component of the at least one encoded image on the projection surface at a rate greater than a refresh rate of the human eye;

wherein the imaging device is configured to cause the at least one encoded image to appear as visible information comprising at least a portion of one or more of a shape and a message on the projection surface.

16. The imaging device of claim 15, wherein the at least one encoded image is encoded on the at least one beam director via a shape and dimension of the surface of the at least one beam director.

17. The imaging device of claim 15, wherein the surface of the at least one beam director includes a plurality of faces.

18. The imaging device of claim 15, wherein the actuator is a rotary actuator and a radius of the at least one beam director is non-uniform relative to an axis of rotation.

19. The imaging device of claim 15, wherein the actuator is a linear actuator, and the at least one beam director includes a clear structure having an incident surface and a refraction surface, each of the refraction surface and the incident surface are at varied angles relative to the beam.

20. The imaging device of claim 15, wherein the surface of the at least one beam director comprises at least one of a non-reflective surface and a diffusive surface.

21. The imaging device of claim 15, further comprising at least one component disposed in a path of the beam after the beam is redirected by the at least one beam director and configured to alter the path of the beam,
wherein the at least one component includes at least one of a mirror and a lens, and
wherein the at least one component is configured to be articulated relative to the at least one beam director.

22. The imaging device of claim 15, wherein the beam source is movable relative to the at least one beam director.

23. A beam director for an imaging device, the beam director comprising:
at least one first surface having a plurality of set angles at a point of incidence, the plurality of set angles being relative to a common reference, wherein
the plurality of set angles of the at least one first surface define a geometry of the beam director encoded with at least one encoded image having at least two dimensions oblique to each other;
wherein,
when a beam produced by a beam source is incident upon the at least one surface, the beam is redirected onto a projection surface based on a respective set angle of the plurality of set angles, and
when the beam director is moved relative to the beam source via mechanical actuation to reflect the beam from each of the plurality of set angles, the beam director is configured to cause the beam to repeatedly trace out the at least one encoded image on the projection surface to enable presentation of each image of the at least one image on the projection surface, thereby creating the effect of a visible rendering of at least a portion of the at least one encoded image upon the projection surface.

24. The beam director of claim 23, wherein the at least one first surface is one of reflective and refractive at the point of incidence.

25. The beam director of claim 23, wherein the multiple set angles of the at least one first surface are configured to progress through a cycle to trace the at least one encoded image.

26. The beam director of claim 23, wherein the multiple set angles of the at least one first surface are configured to progress through a cycle to trace the at least one encoded image.

* * * * *